(12) United States Patent
Benton

(10) Patent No.: US 8,678,492 B2
(45) Date of Patent: Mar. 25, 2014

(54) CHILLER FOR DRIVER'S SEAT OF A MOTOR VEHICLE

(76) Inventor: David Benton, Cicero, NY (US)

( * ) Notice: Subject to any disclaimer, the term of this patent is extended or adjusted under 35 U.S.C. 154(b) by 772 days.

(21) Appl. No.: 12/209,522

(22) Filed: Sep. 12, 2008

(65) Prior Publication Data

US 2010/0066133 A1    Mar. 18, 2010

(51) Int. Cl.
*A47C 7/72*    (2006.01)
*A47C 31/00*   (2006.01)
*F25D 23/12*   (2006.01)
*B60H 1/32*    (2006.01)

(52) U.S. Cl.
USPC ........... 297/180.1; 62/259.3; 62/261; 62/244; 297/180.15; 297/180.14

(58) Field of Classification Search
USPC ......... 62/259.3, 261, 244; 297/180.1, 180.15, 297/180.14
See application file for complete search history.

(56) References Cited

U.S. PATENT DOCUMENTS

| 2,430,335 | A | | 11/1947 | Hart | |
| 2,722,266 | A | * | 11/1955 | Kersten | 297/180.15 |
| 2,989,854 | A | * | 6/1961 | Gould | 62/243 |
| 3,595,029 | A | * | 7/1971 | Lende, Jr. | 62/244 |
| 3,844,130 | A | * | 10/1974 | Wahnish | 62/133 |
| 5,138,851 | A | | 8/1992 | Mardikian | |
| 5,450,894 | A | * | 9/1995 | Inoue et al. | 165/43 |
| 5,613,730 | A | | 3/1997 | Buie et al. | |
| 6,079,458 | A | | 6/2000 | Esaki et al. | |
| 6,139,109 | A | * | 10/2000 | Lajoie | 297/452.28 |
| 6,230,501 | B1 | * | 5/2001 | Bailey et al. | 62/51.1 |
| 6,254,179 | B1 | | 7/2001 | Kortum et al. | |
| 6,382,911 | B1 | * | 5/2002 | Beltowski | 415/206 |
| 6,679,079 | B2 | * | 1/2004 | Nagai et al. | 62/244 |
| 7,083,514 | B1 | * | 8/2006 | Stamey et al. | 454/156 |
| 7,296,304 | B2 | | 11/2007 | Goldsborough | |
| 2003/0209893 | A1 | * | 11/2003 | Breed et al. | 280/735 |
| 2004/0255364 | A1 | * | 12/2004 | Feher | 2/171.3 |
| 2005/0099032 | A1 | * | 5/2005 | Dehart | 296/68.1 |
| 2005/0139351 | A1 | * | 6/2005 | Chambers | 165/297 |
| 2005/0184565 | A1 | * | 8/2005 | Weiss et al. | 297/180.15 |
| 2006/0032265 | A1 | * | 2/2006 | Shaw | 62/420 |
| 2008/0302119 | A1 | * | 12/2008 | Shaw | 62/241 |
| 2008/0307820 | A1 | * | 12/2008 | Ingram | 62/324.6 |

* cited by examiner

*Primary Examiner* — Allen Flanigan
*Assistant Examiner* — Filip Zec
(74) *Attorney, Agent, or Firm* — Bernhard P Molldrem, Jr.

(57) ABSTRACT

A DC powered refrigeration package supplies refrigerant to an evaporator coil that is incorporated into the driver's seat of a race car. The DC-powered compressor, condenser and condenser fan are contained within an enclosure that can be situated behind the driver's seat. The refrigeration circuit chills the seat to below freezing, favorably to about 20° F. or below.

9 Claims, 4 Drawing Sheets

CHILLER FOR DRIVER'S SEAT OF A MOTOR VEHICLE

BACKGROUND OF THE INVENTION

This invention relates to automotive air conditioning and refrigeration systems, and is more particularly concerned with an electrically powered refrigeration system for chilling the driver's seat of a motor vehicle, such a race car.

At the present time, particularly in competitive motor sports, driver comfort has become an issue because the driver's compartment of the race vehicle becomes unbearably warm, with temperatures often well over 100° F. Some attempts have been made to provide air flow to the driver's helmet or into the driver's clothing to alleviate this. However, the results have not been satisfactory. A small DC-powered cooler has been proposed for providing cool air to the driver's helmet, but that does not provide bodily comfort for the driver's torso.

In automobile racing, organizational rules limit the engine size and displacement. Any air conditioning system that is belt-driven from the engine, i.e., where the engine would directly power the compressor and condenser fan, would create an unacceptable load on the engine which would compromise race performance during an event. Therefore, any standard, engine-powered air conditioning system would not be an acceptable solution.

A climate-controlled car seat has been proposed in U.S. Pat. No. 6,254,179 (Kortüm et al.), in which warm or cold water is flowed into coils that are embedded in the seat. The cooling or heating fluid is taken from the car's heating system or air conditioning system. Also, automotive air conditioning systems have been proposed in which the evaporator coil is located within the back of a car seat, for the purpose of distributing chilled air throughout the passenger compartment, and one example of this is described in U.S. Pat. No. 2,430,335 (Hart). None of these earlier proposals is capable of chilling the driver's seat itself to a low temperature (such as 20° F.) nor does any of them employ a compressor and fan that can operate without placing a load on the engine during the race.

OBJECTS AND SUMMARY OF THE INVENTION

Accordingly, it is an object of the invention to provide driver comfort during a race event, with an effective and simple arrangement and without placing a load upon the vehicle engine, while avoiding other problems not adequately addressed in the prior art.

It is another object to provide a seat chiller arrangement that can be entirely driven from the vehicle battery, and in which the major components such as the compressor, condenser coil, condenser fan, and control circuitry are all contained within a box or enclosure that can be conveniently situated in an available space behind the driver's seat.

According to one aspect of this invention, a seat chilling system is provided for cooling the driver's seat of a motor vehicle, which may be a race car, or may be a snow machine, a watercraft or other vehicle type. The vehicle has a dc electrical system, typically 12 volts with positive and negative power terminals. In most cases, the negative terminal is also chassis ground. A refrigerant circuit is formed of an evaporator coil, an electrically powered compressor, a condenser coil connected to a pressure side of the compressor, an expansion valve, and refrigerant conduit that joins the expansion valve to the evaporator coil and joins the evaporator coil to a suction side of the compressor. In this arrangement, the evaporator coil is in the form of a grid embedded within the driver's seat and this grid is configured for directly chilling the driver's seat down to a temperature below freezing (i.e., 20° F. or below).

A box or enclosure, which is positioned within the vehicle behind the driver's seat, contains within it the dc-powered compressor, the condenser coil, the condenser fan adapted to induce a flow of air through the condenser coil, and the control circuit, which is coupled to the positive and negative power terminals of the vehicle electrical system, and provides dc power to the compressor and to the condenser fan. The compressor and the condenser fan are electrically powered only and not driven from the engine of the motor vehicle. An intake air duct brings outside air into the enclosure, and an outlet air duct conducts exhaust air from the enclosure to outside the vehicle.

A thermostatic expansion valve is employed, having a variable aperture size that changes with thermal load, so as to maintain a fill of refrigerant in the evaporator coil grid as the thermal load on the driver's seat changes.

In a preferred embodiment, the enclosure is in the form of a box or housing having a wide portion at which said condenser coil is situated, a tapered portion leading from the inlet duct to the wide portion, and another tapered portion leading from the wide portion to the outlet duct. The geometry of the enclosure provides optimal exhaust of the condenser heat to the outside air.

In some possible embodiments, the system can also have a cold air conduit that extends from said driver's seat to the driver's helmet, to bring chilled air to the driver's helmet. This can involve an additional fan and filter to blow the air into the seat and past the evaporator grid into the helmet conduit. The filter can remove carbon monoxide from the air in the driver's compartment that is supplied to the helmet.

The above and many other objects, features, and advantages of this invention will become apparent to persons skilled in the art from the ensuing description of a preferred embodiment, which should be considered in connection with the accompanying Drawing.

DETAILED DESCRIPTION OF A PREFERRED EMBODIMENT

Figure 1:
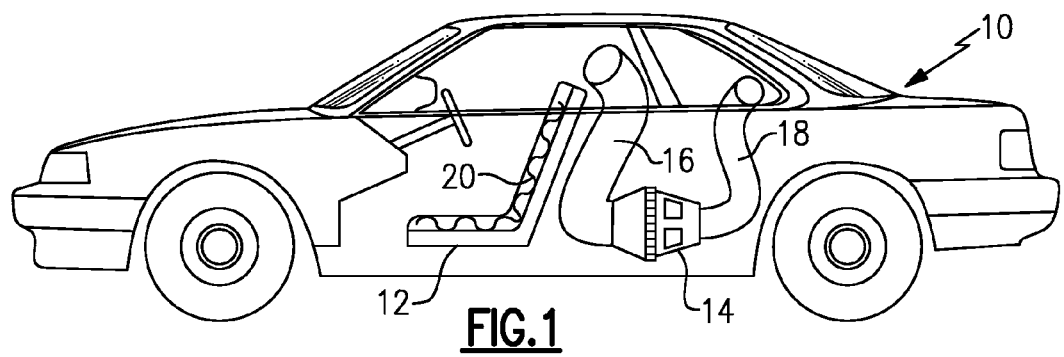
FIG. 1 is a side view that schematically illustrates a race car employing the seat chiller arrangement according to one embodiment of the present invention.

With reference to the Drawing, and initially to FIG. 1 thereof, a racing motor vehicle, to wit, a race car 10 is shown with a driver's seat 12 and an air conditioning or seat chiller package situated in the vehicle cabin, in a space behind the driver's seat. Here, the package is in the form of a box or enclosure 14 that contains the active refrigeration elements that will be discussed shortly. An intake hose or conduit 16 brings fresh outside air to the enclosure 14, and an outlet hose 18 carries exhaust air from the enclosure back to the ambient outside the vehicle 10. While not shown specifically here, the vehicle is understood to have an engine and drive train, and a dc electrical system with a battery, typically twelve volts, negative chassis ground. A refrigerant coil, to wit, evaporator coil 20 is shown here embedded into the driver's seat 12.

Figure 2:
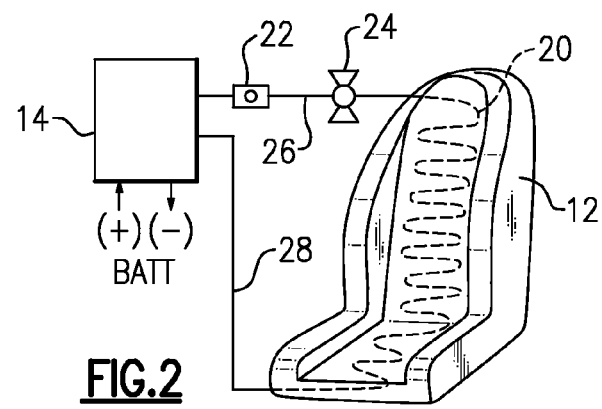
FIG. 2 is a schematic view of the chiller arrangement with a seat according to this invention.

A schematic of the package 14 with the external parts of the refrigerant circuit are shown in FIG. 2. The seat 12 is molded or cast of aluminum. The chiller package 14 has dc electrical leads (+), (−) that connect to the vehicle battery, i.e. to the electrical system. The condensed high pressure liquid refrigerant flow through a sight glass 22 and a thermostatic expansion valve 24, along a refrigerant conduit on its way to the evaporator coil 20. Here the coil 20 is in the form of a grid that is attached directly onto the aluminum seat. The seat can then be covered with a sturdy foam or other cushioning material to make up the seat base and seat back. The refrigerant vapor then proceeds from the evaporator coil via another refrigerant conduit 28 back to a low pressure inlet of the compressor housed in the chiller package 14.

Figure 3:
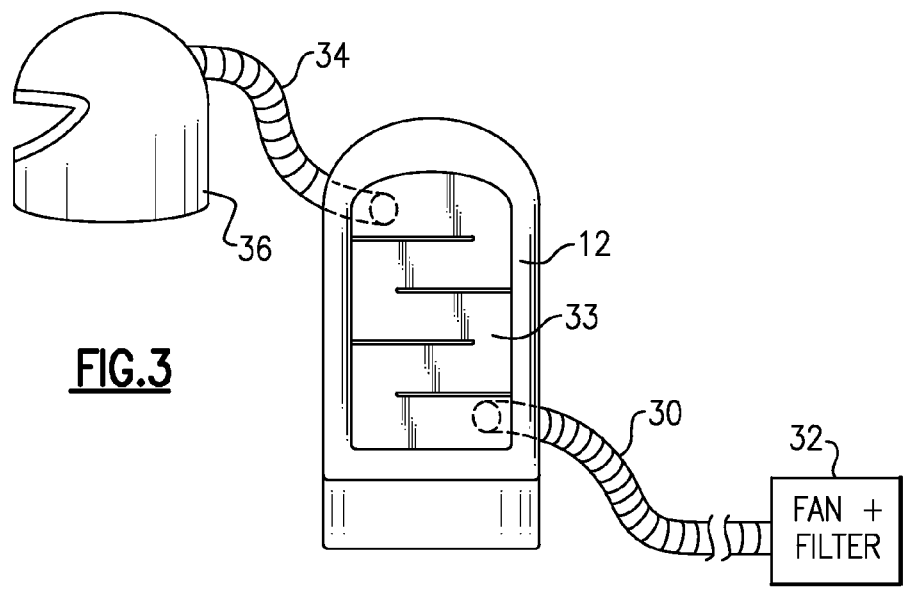
FIG. 3 illustrates a helmet cool air feature that can be optionally included.

A helmet cooling option is shown in FIG. 3, in which ambient air, which can be provided from a small fan and filter, e.g., active carbon to remove the CO content of the air, feeds the air through a flexible air duct 30 to a grid 33 on the back of the seat 12. This cools the air and can remove some humidity. The air is then supplied through another flexible conduit 24 to the driver's helmet 36. The air that is passed through the car seat grid 33 and then to the helmet 36 is cooled about 25 degrees below ambient, i.e., from an ambient 110° to a more comfortable 85° F.

Figure 4:
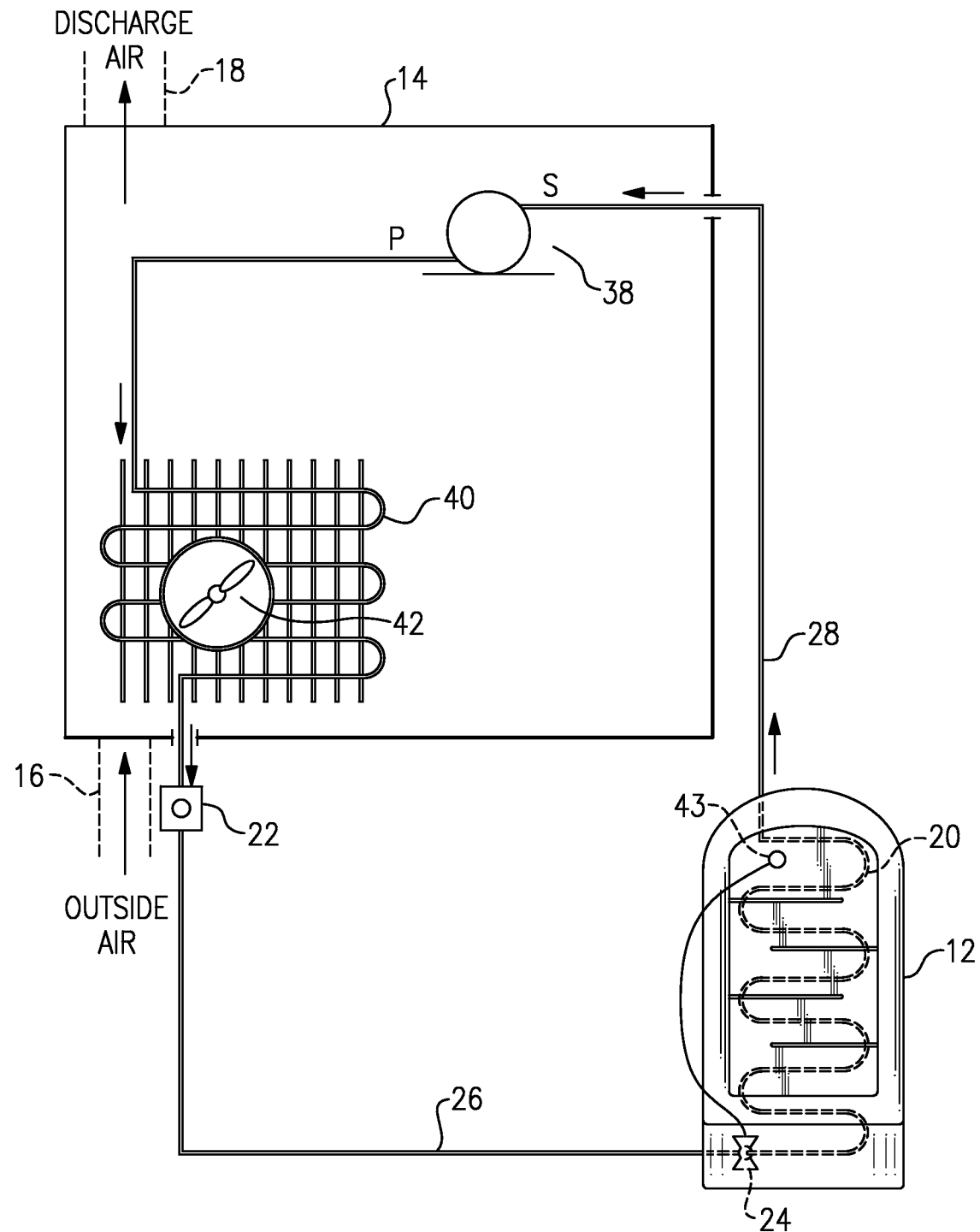
FIG. 4 is a schematic view of the refrigerant circuit of this embodiment.

The refrigerant circuit of this embodiment is shown schematically in FIG. 4. A compressor 38, a condenser coil 40 and a condenser fan 42 are contained within the enclosure or housing 14. The return refrigerant vapor is fed from the conduit 28 to a suction port S of the compressor, and a pressure port P of the compressor supplies the high pressure refrigerant to the condenser coil 40. The condensed high-pressure refrigerant liquid then leaves the enclosure via the conduit 26 that supplies the thermostatic expansion valve 24, which meters refrigerant into the evaporator grid 20 in the seat. The condenser fan 42 draws outside air in through the intake hose 16, and the air passes over the condenser coil 40 and is discharged or exhausted out the outlet hose 18. The sight glass 22 is provided on the conduit 26 for use in charging the system with refrigerant. The thermostatic expansion valve 24 has a variable orifice, and also has a remote sensing bulb 43 that is sensitive to the coil temperature of the evaporator grid 20, so that the evaporator grid is kept filled with liquid refrigerant when the heat load changes.

Here, the compressor 38 is hermetically sealed, and operates at a nominal 12 volts dc. The compressor has built-in thermal protection, and built-in voltage protection. In one preferred embodiment, there is a low-voltage cut out at 10.4 volts, a cut in at 11.7 volts, and a high-voltage cut out at 17 volts. The compressor has a nominal run current of about 7 amps, but has a start surge current of about 12 amps. The condenser fan has a maximum 4.5 ampere draw at 12 volts dc. The condenser coil 40 has a total of 24 passes, 18 condenser passes and six subcooler passes, and has a heat exchange capacity of about 4000 BTU/hr at 120° F. ambient. In this embodiment, the condenser coil 40 is oversized for the expected heat load, so that the system operates well even under the higher ambient conditions of automotive racing.

Figure 5:
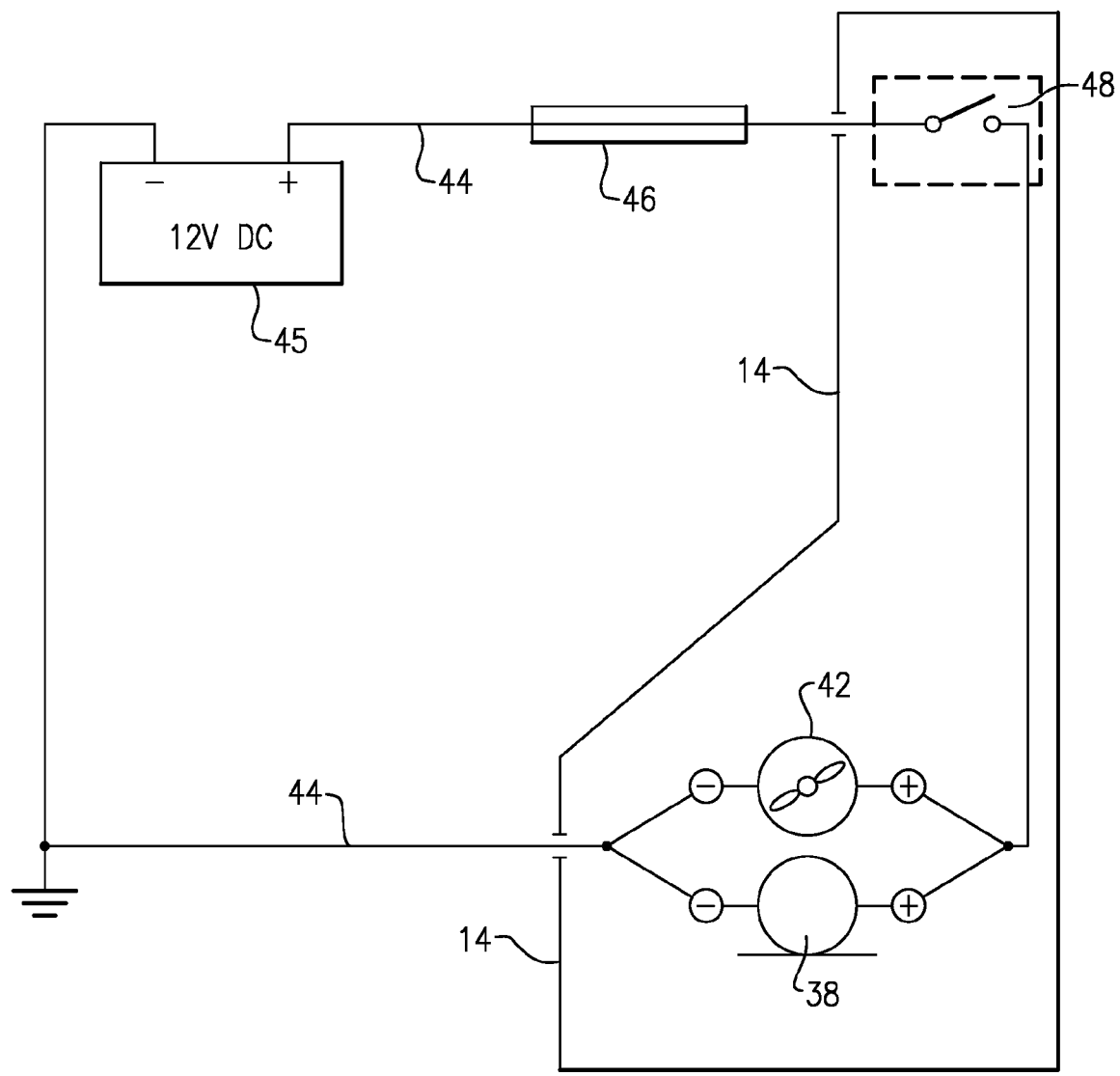
FIG. 5 is a schematic view of the electrical circuit of this embodiment.

Turning to FIG. 2, the electrical circuitry has a pair of power conductors 44 that to from the housing of the 14 to positive and negative terminals of the vehicle battery 45. These can preferably be a pre-molded pair of #10-gauge copper conductors. In the positive-side conductor is a fifteen-ampere fuse 46. This conductor 44 leads to a switch located within the control circuit 48, which is located inside the package housing or enclosure 14. The control circuit 48 goes to the condenser fan 42 and the compressor 38 located within the enclosure 14. The fan 42 in this embodiment is a single speed fan, and the compressor can be a single-speed to four-speed compressor, so as to accommodate varying loads. In other possible embodiments, the fan 42 can be a two speed fan or multiple speed fan. The fan speed and compressor speed are controlled by suitable circuitry in the control circuit 48. The on-off switch shown in FIG. 5 should be capable of handling 20 amperes. The control circuit 48 also operates indicator LEDs or pilot lights on the enclosure or housing 14, as well as remote indicator LEDs visible to the driver during the race. The remote indicator LEDs can report malfunction, such as high-voltage or low-voltage conditions, for example.

Figure 6:
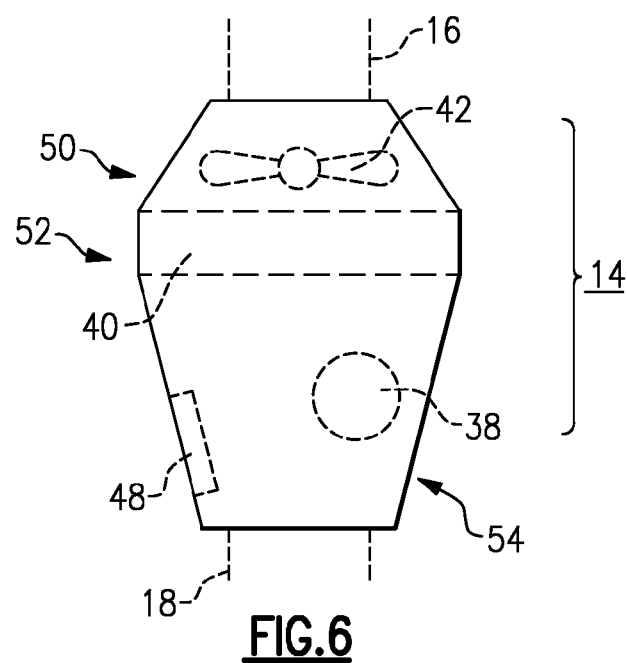
FIGS. 6, 7, and 8 are a top plan, end view and side view, respectively, of the enclosure or housing of the seat chiller arrangement of this embodiment.
Figure 7:
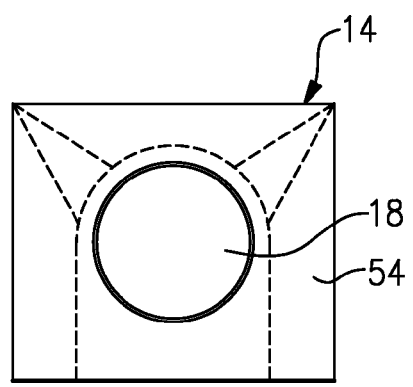
Figure 8:
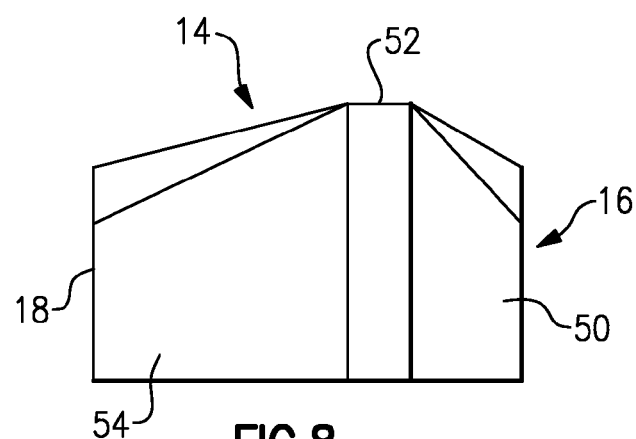

The design of the package housing or enclosure 14 is shown in FIGS. 6, 7 and 8. At one end there is a first tapered portion 50, which leads from a narrow end at which the air intake hose 16 is connected, to a wide middle portion 52 at which the condenser coil 40 is situated. Then there is a second tapered section 54 that narrow to an end at which the exhaust air hose 18 is located. The control circuit 48, compressor 38 and condenser fan 42 can be located in this second tapered portion 54.

The compressor can use a standard R143a refrigerant, or a different refrigerant can be selected, keeping in mind the desired seat temperature of about 20° F. and the ambient temperature which may reach 120° F. In some cases, the seat can be chilled down to minus 5° F.

Prior to the race event, external dc power can be applied to the device to pre-cool the seat, saving on fuel and battery charge.

While the vehicle seat chiller arrangement of this invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

I claim:

1. Seat chilling system for cooling a driver's racing seat mounted in a cabin of a racing motor vehicle, said motor vehicle having a dc electrical system with positive and negative power terminals, the system comprising a racing seat for the driver of the racing motor vehicle, the seat being molded or cast of a rigid heat conductive material, a refrigerant circuit that includes an evaporator coil, an electrically powered compressor, a condenser coil connected to a pressure side of said compressor, an expansion valve, and refrigerant conduit connecting the expansion valve to said evaporator coil and connecting the evaporator coil to a suction side of said compressor, wherein the refrigerant circuit is of sufficient capacity to provide sufficient cooling to the racing seat to chill the latter to said temperature below freezing, wherein said condenser coil has a heat exchange capacity of at least 4000 BTU/hr at an ambient of 120° F.;

wherein said evaporator coil is in the form of a grid attached directly onto the rigid heat conductive racing seat and directly chilling the driver's racing seat to a temperature below freezing, and wherein said condenser coil comprises a plurality of condenser passes followed by a plurality of subcooler passes to achieve a heat exchange capacity sufficient so that condensed refrigerant supplied to the evaporator chills the evaporator and associated racing seat to a temperature below freezing;

an enclosure positioned within the cabin of said vehicle behind the driver's seat, the enclosure containing within it said compressor, said condenser coil, a dc-powered condenser fan adapted to induce a flow of air through said condenser coil, and a control circuit coupled to said positive and negative power terminals, and providing dc power to said compressor and to said condenser fan;

an intake air duct bringing outside air into said enclosure; and an outlet air duct conducting exhaust air from said enclosure to outside the vehicle;

wherein said expansion valve is a thermostatic expansion valve having an aperture size that changes with thermal load to maintain a fill of refrigerant in said evaporator coil grid as the thermal load on the driver's seat changes; and is coupled to a remote sensing bulb that is in thermal contact with said grid that is attached directly onto the driver's racing seat, and which is sensitive to the coil temperature of the evaporator grid, so that the evaporator grid is kept properly filled with liquid refrigerant when the heat load changes so as to achieve sufficient cooling to keep the racing seat chilled to said temperature below freezing.

2. The seat chilling system of claim 1 wherein said compressor and said condenser fan are electrically powered only and not driven by the engine of the motor vehicle.

3. The seat chilling system of claim 2 wherein said compressor and said fan are adapted to operate on electrical power of twelve volts dc.

4. The seat chilling system of claim 1 wherein said refrigerant circuit is operatively adapted to chill said driver's seat to a temperature of 20° F. or below.

5. The seat chilling system of claim 1 wherein said condenser coil comprises six subcooler passes.

6. Seat chilling system for cooling a driver's racing seat mounted in a cabin of a racing motor vehicle, said motor vehicle having a dc electrical system with positive and negative power terminals, the system comprising a racing seat for the driver of the racing motor vehicle, the seat being molded or cast of a rigid heat conductive material, a refrigerant circuit that includes an evaporator coil, an electrically powered compressor, a condenser coil connected to a pressure side of said compressor, an expansion valve, and refrigerant conduit connecting the expansion valve to said evaporator coil and connecting the evaporator coil to a suction side of said compressor, the refrigerant circuit having sufficient capacity to provide sufficient cooling to the racing seat to chill the latter to a temperature below freezing, and wherein said condenser coil comprises a plurality of condenser passes followed by a plurality of subcooler passes to achieve a heat exchange capacity sufficient so that condensed refrigerant supplied to the evaporator chills the evaporator and associated racing seat to said temperature below freezing;

wherein said evaporator coil is in the form of a grid attached directly onto the rigid heat conductive driver's racing seat and directly chilling the driver's racing seat to a temperature below freezing, wherein said condenser coil has a heat exchange capacity of at least 4000 BTU/hr at an ambient of 120° F.;

an enclosure positioned within the cabin of said vehicle behind the driver's seat, the enclosure containing within it said compressor, said condenser coil, a dc-powered condenser fan adapted to induce a flow of air through said condenser coil, and a control circuit coupled to said positive and negative power terminals, and providing dc power to said compressor and to said condenser fan;

an intake air duct bringing air into said enclosure; and an outlet air duct conducting exhaust air from said enclosure; and further comprising means feeding air into the grid that is attached directly to the rigid heat-conducting racing seat; and a cold air conduit extending from said driver's racing seat to a driver's helmet to carry cooled air from the car seat to the driver's helmet; said means including an inlet conduit drawing in ambient air and directing same into a space in said seat in contact with said grid to cool the air, and having a fan forcing the ambient air through the inlet conduit into said seat and thence into the cold air conduit; with said cold air conduit being connected between said space in said seat and said driver's helmet; and wherein said expansion valve is a thermostatic expansion valve having an aperture size that changes with thermal load to maintain a fill of refrigerant in said evaporator coil grid as the thermal load on the driver's racing seat changes; and is coupled to a remote sensing bulb that is in thermal contact with the grid that is attached directly to the driver's racing seat, so that the evaporator grid is kept properly filled with liquid refrigerant when the heat load changes, such that the evaporator coil achieves sufficient cooling to keep the racing seat chilled to said temperature below zero.

7. The seat chilling system of claim 6 the cold air conduit comprising a filter that removes carbon monoxide.

8. The seat chilling system of claim 6 wherein the inlet conduit of said means feeding air into said car seat includes an active carbon filter for filtering the air supplied to said driver's helmet.

9. The seat chilling system of claim 6 wherein said condenser coil comprises six subcooler passes.

* * * * *